United States Patent
Juhnke et al.

(10) Patent No.: US 9,587,764 B2
(45) Date of Patent: Mar. 7, 2017

(54) CONTROL VALVE TRIM ASSEMBLY HAVING A CAGE WITH DIAMOND-SHAPED OPENINGS

(71) Applicant: FISHER CONTROLS INTERNATIONAL LLC, Marshalltown, IA (US)

(72) Inventors: David Charles Juhnke, Lake Park, MN (US); Joshua Charles Crompton, Beaman, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 0 days.

(21) Appl. No.: 14/515,679

(22) Filed: Oct. 16, 2014

(65) Prior Publication Data

US 2015/0108379 A1    Apr. 23, 2015

Related U.S. Application Data

(60) Provisional application No. 61/894,236, filed on Oct. 22, 2013.

(51) Int. Cl.
| | | |
|---|---|---|
| F16K 47/08 | (2006.01) | |
| F16K 3/24 | (2006.01) | |
| F16K 3/34 | (2006.01) | |

(52) U.S. Cl.
CPC ............. *F16K 47/08* (2013.01); *F16K 3/24* (2013.01); *F16K 3/34* (2013.01); *Y10T 137/86734* (2015.04)

(58) Field of Classification Search
CPC ..... Y10T 137/86734; Y10T 137/86759; Y10T 137/86718; Y10T 137/86807; Y10T 137/86799; F16K 47/04; F16K 47/08; F16K 47/14; F16K 3/34; F16K 3/0263; F16K 3/0209; F16K 1/52
USPC .............. 137/625.28, 625.3, 625.33, 625.37, 137/625.38, 625.39; 251/118; 138/40, 43
See application file for complete search history.

(56) References Cited

U.S. PATENT DOCUMENTS

| | | |
|---|---|---|
| 1,150,743 A | 8/1915 | Butts |
| 4,384,592 A | 5/1983 | Ng |
| 5,014,746 A | 5/1991 | Heymann |
| 7,802,592 B2 * | 9/2010 | McCarty ................ F16K 47/08 137/625.3 |

(Continued)

FOREIGN PATENT DOCUMENTS

WO    WO-2009015094 A1    1/2009

OTHER PUBLICATIONS

International Search Report for International application No. PCT/US2014/061670, dated Jan. 23, 2015.

(Continued)

*Primary Examiner* — Michael R Reid
(74) *Attorney, Agent, or Firm* — Marshall, Gerstein & Borun LLP

(57) ABSTRACT

A fluid valve includes a valve body having a fluid inlet and a fluid outlet connected by a fluid passageway. A valve seat is disposed within the fluid passageway. A fluid control member is movably disposed within the fluid passageway, the fluid control member cooperating with a trim assembly to control fluid flow through the fluid passageway. The trim assembly includes a cage having a plurality of diamond-shaped openings disposed in a wall thereof.

16 Claims, 4 Drawing Sheets

(56) References Cited

U.S. PATENT DOCUMENTS

2007/0240774 A1 10/2007 McCarty
2009/0026395 A1* 1/2009 Perrault .................. F16K 47/08
　　　　　　　　　　　　　　　　　　　　　　　　251/127

OTHER PUBLICATIONS

Written Opinion for International application No. PCT/US2014/061670, dated Jan. 23, 2015.
International Preliminary Report on Patentability for International application No. PCT/US2014/061670, issued Apr. 26, 2016.

* cited by examiner

CONTROL VALVE TRIM ASSEMBLY HAVING A CAGE WITH DIAMOND-SHAPED OPENINGS

RELATED PATENT APPLICATIONS

This patent application claims priority benefit of U.S. Provisional Patent Application No. 61/894,236, filed Oct. 22, 2013; the entirety of which is incorporated by reference herein.

FIELD OF THE DISCLOSURE

The invention generally relates to control valves including a trim assembly having a high flow region and more specifically to trim assemblies including a cage having diamond-shaped openings.

BACKGROUND

Fluid valves control the flow of fluid from one location to another. When the fluid valve is in a closed position, high pressure fluid on one side is prevented from flowing to a lower pressure location on the other side of the valve. Often fluid valves contain a movable fluid control member and a seat of some sort that cooperates with the fluid control member to control fluid flow through the valve. In some cases it may be desirable to characterize fluid as it flows through the valve, for example, to reduce noise. In these cases, a trim assembly may be used that includes a cage with a plurality of openings. The openings may be sized and shaped to characterize fluid flow through the trim assembly. During normal operations, system demand may require limited movement of the fluid control member. However, during high demand or surge operations, the cage openings may restrict fluid flow through the trim assembly to a level less than what is required by the surge condition because the cage openings simply do not have sufficient flow capacity to meet the need of the surge operation.

SUMMARY OF THE DISCLOSURE

A fluid valve includes a valve body having a fluid inlet and a fluid outlet connected by a fluid passageway. A trim assembly is disposed within the fluid passageway, the trim assembly including a cage and a valve seat. A fluid control member is movably disposed within the fluid passageway and within the cage, the fluid control member cooperating with the valve seat to control fluid flow through the fluid passageway. The cage includes a plurality of diamond-shaped openings.

DETAILED DESCRIPTION

The trim assemblies described herein advantageously provide large increases in flow area with minimal travel of a fluid control element, such as a valve plug. The disclosed trim assemblies may be used as stand-alone trim assemblies, or the disclosed cage openings may be combined with other trim assemblies to produce trim assemblies that characterize fluid flow while having an anti-surge capability. The disclosed cage openings improve radial strength of the cage, which allows the disclosed trim assemblies to be used in high pressure drop operations, such as compressor anti-surge operations. The disclosed trim assemblies may be particularly useful in sliding stem control valves.

Additionally, the disclosed trim assemblies result in control valves that have smaller cages relative to known trim assemblies, and thus the disclosed trim assemblies may be used in control valves having smaller valve bodies. While the cages are generally smaller than known cages for a given use, the disclosed cages include a high flow capacity region having a rapidly increasing flow area for a given valve plug travel. As a result, the disclosed trim assemblies are particularly useful in two-stage trim assemblies where a first stage includes a drilled hole pattern that throttles (or characterizes) fluid flow over a normal range of demand and a second stage having specially shaped openings or ports to provide a large increase in flow area for minimal increases in valve plug travel to allow rapid increase in fluid flow during high demand situations.

Figure 1:
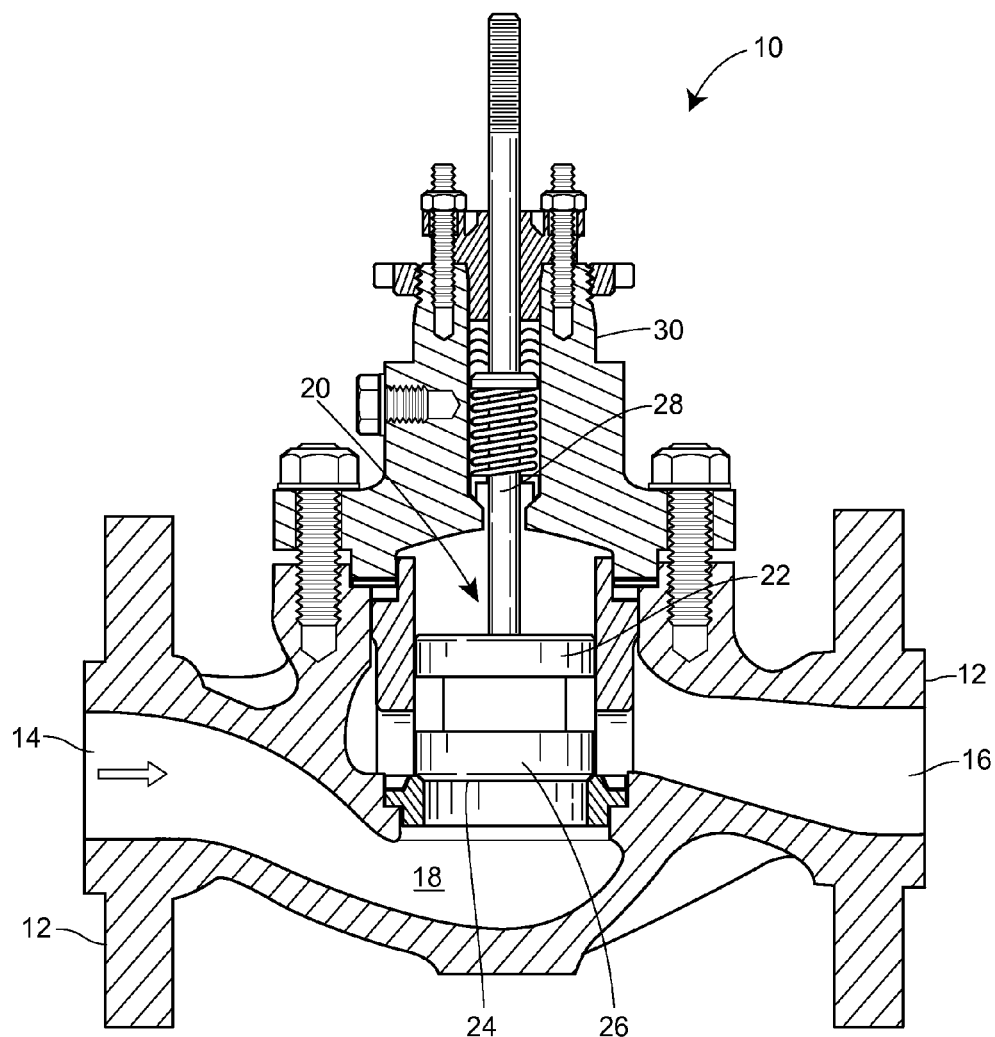
FIG. 1 is a cross-sectional view of a control valve having a trim assembly constructed in accordance with the teachings of the disclosure.

Turning now to FIG. 1, a control valve 10 includes a valve body 12 having a fluid inlet 14 and a fluid outlet 16 connected by a fluid passageway 18. A trim assembly 20 is disposed within the valve body 12 between the fluid inlet 14 and the fluid outlet 16. The trim assembly 20 includes a cage 22 and a seat 24. A fluid control member, such as a plug 26 is disposed within the cage 22 and the plug 26 interacts with the seat 24 to control fluid flow through the valve body 12. A stem 28 is connected to the plug 26 at one end and an actuator 30 at another end. The actuator 30 controls movement of the plug 26 within the cage 22.

Figure 2:
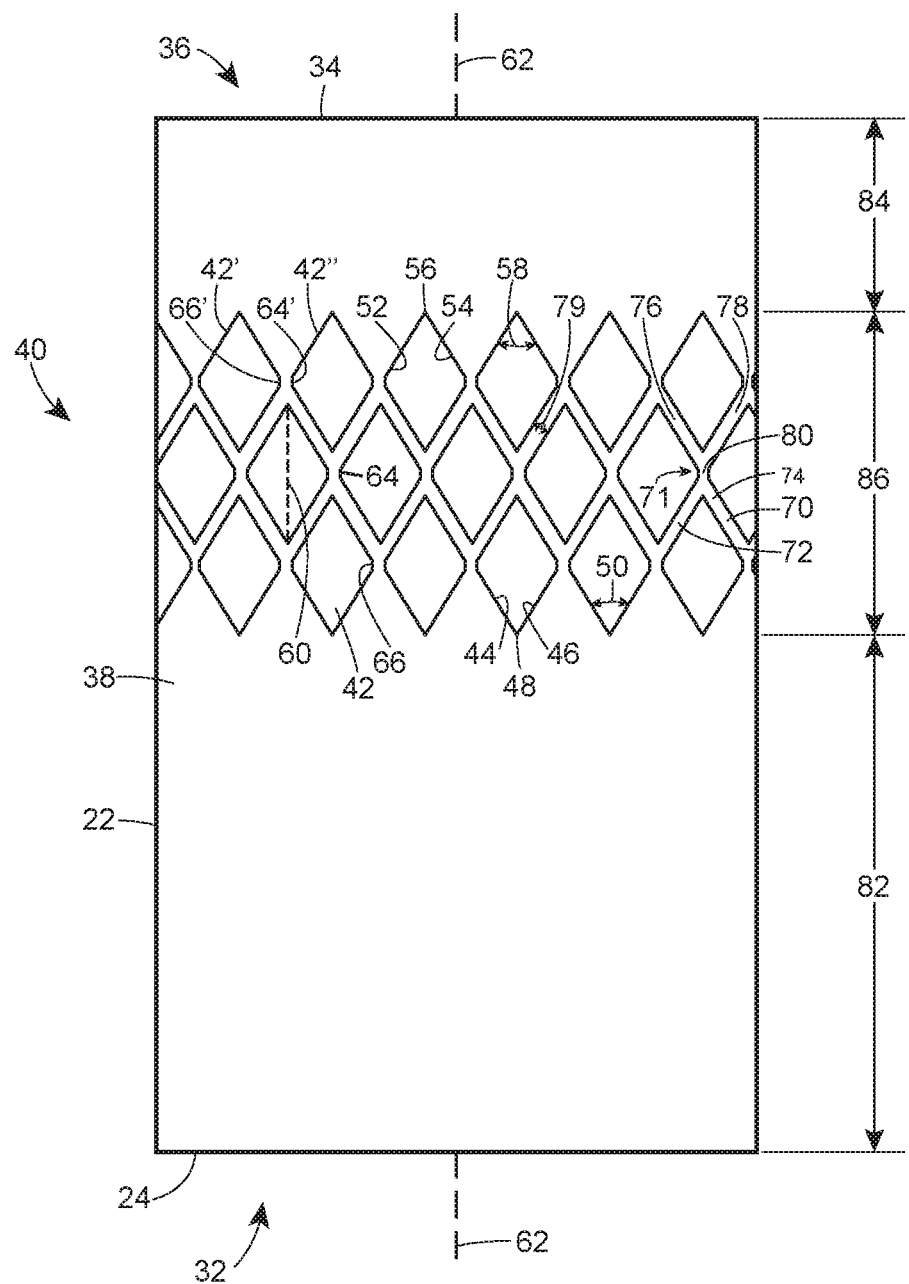
FIG. 2 is a close up view of a cage of the trim assembly of FIG. 1.

As illustrated in FIG. 2, one embodiment of a cage 22 includes the seat 24 at a first end 32 and an opening 34 at a second end 36. A cage wall 38 extends between the first end 32 and the second end 36, the cage wall 38 forming a hollow central bore within which the valve plug 26 slides to control fluid flow through the cage 22. A plurality of cage openings 40 is formed in the cage wall 38. The plurality of cage openings 40 may include one or more diamond-shaped openings 42. The diamond-shaped opening 42 may include a first edge 44 and a second edge 46 that form a first intersection 48. The first edge 44 and the second edge 46 may form a first angle 50 of approximately 30 degrees. Preferably the first angle 50 may be in the range of approximately 10 degrees to approximately 80 degrees, more preferably between 20 degrees and 60 degrees, and even more preferably between 25 degrees and 40 degrees. The first angle 50 in the disclosed ranges advantageously allow a high density of diamond-shaped openings 42 to be located in the cage wall 38.

The diamond-shaped opening 42 may also include a third edge 52 and a fourth edge 54 that form a second intersection 56. The second intersection 56 may include a second angle 58 in the same ranges described above for the first angle 50. A line between the first intersection 48 and the second intersection 56 defines a longitudinal axis 60 of the diamond-shaped opening 42. In the embodiment of FIG. 2, the longitudinal axis 60 is oriented substantially parallel to a longitudinal axis 62 of the cage 22. In other embodiments, the longitudinal axis 60 may be oriented substantially perpendicular to the longitudinal axis 62 of the cage.

The diamond-shaped opening 42 may optionally include a first flat edge 64 connecting the first edge 44 and the third edge 52 and a second flat edge 66 connecting the second edge 46 and the fourth edge 54. When a first diamond-shaped opening 42' and a second diamond-shaped opening 42" are located adjacent to one another, the second flat edge 66' of the first diamond-shaped opening 42' may be located adjacent to the first flat edge 64" of the second diamond-shaped opening 42", and vice versa. As a result, a web 70 may be formed between the individual diamond-shaped openings 42 in the plurality of diamond-shaped openings 40. The web 70 may include a plurality of X-shaped plugs 71 that have a first leg 72, a second leg 74, a third leg 76, and a fourth leg 78 that intersect at a center portion 80. The web 70 gives radial strength to the cage 22 in the region of the plurality of diamond-shaped openings 40. In some embodiments, the first leg 72, second leg 74, third leg 76, and fourth leg 78 may have a thickness 79 in the range of approximately 1 mm to approximately 25 mm, more preferably in the range of approximately 5 mm to approximately 20 mm, and even more preferably in the range of approximately 10 mm to approximately 20 mm. Thicknesses in the disclosed ranges result in a nearly optimal tradeoff between radial strength and increased flow area.

In the embodiment of FIG. 2, the plurality of diamond-shaped openings 40 may be separated from the seat 24 by a first distance 82. Similarly, the plurality of diamond-shaped openings 40 may be separated from the second end 36 of the cage 22 by a second distance 84. The first and second distances 82, 84 limit the plurality of openings 40 to a high flow region 86. In other embodiments, the plurality of diamond shaped openings 40 may extend completely to the first end 32, the second end 34, or both.

Figure 3:
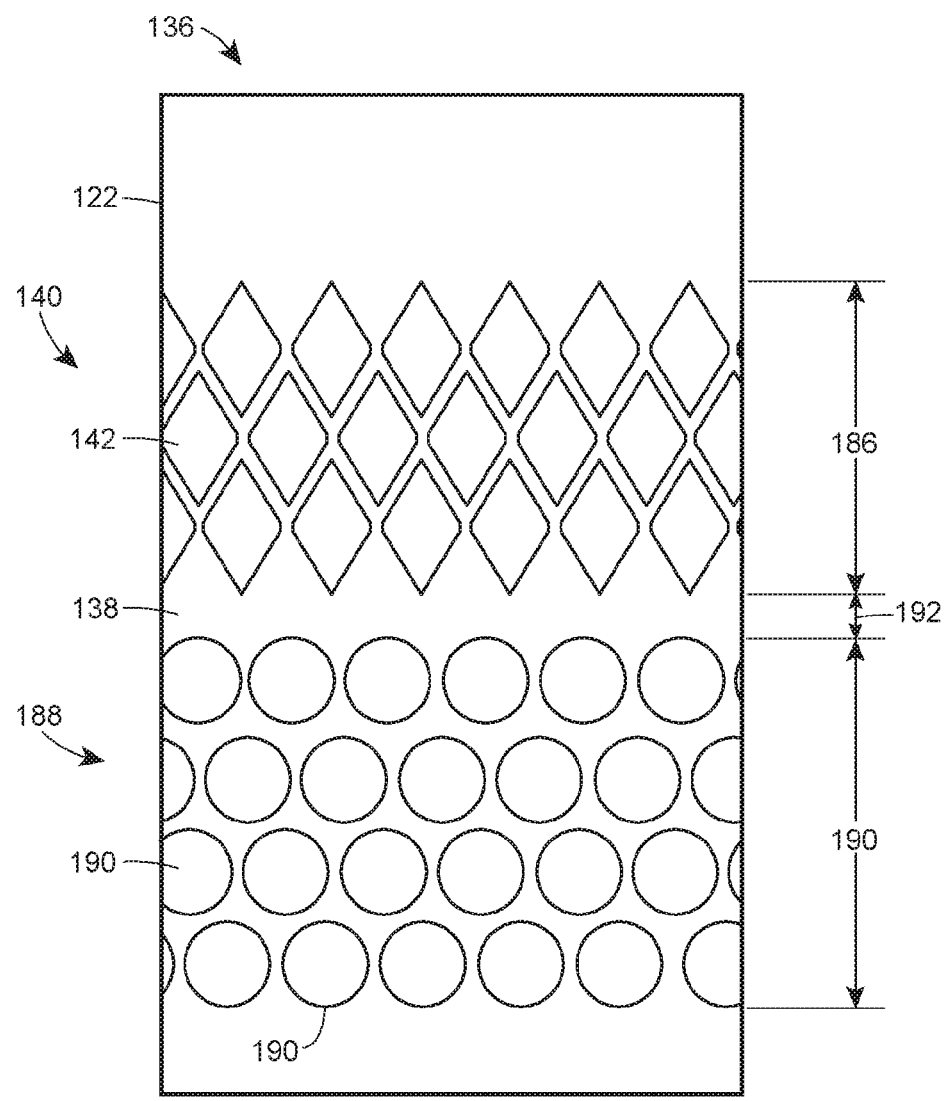
FIG. 3 is a close up view of an alternate embodiment of the trim assembly of FIG. 1.

As illustrated in FIG. 3, another embodiment of a cage 122 may include a plurality of diamond-shaped openings 40. At least one diamond-shaped opening 142 may be shaped as described above with respect to FIG. 2. The plurality of diamond-shaped openings 40 produces a high flow region 186. A plurality of flow characterizing openings, such as a plurality of noise-attenuating openings 188, may be formed in the cage wall 138. The plurality of noise-attenuating openings 188 may include one or more circular openings 190 that characterize fluid flow through the valve during normal operations. Thus, the plurality of noise-attenuating openings 188 produce a flow characterizing region 190. A transition region 192 is formed between the high flow region 186 and the flow characterizing region 190. During normal operations, fluid may flow through the plurality of noise-attenuating openings 188 in the flow characterizing region 190. When downstream demand exceeds flow capacity of the flow characterizing region 190, such as during surge operations, the valve plug 26 (FIG. 1) opens sufficiently to allow fluid to begin flowing through the plurality of diamond-shaped openings 140 in the high flow region 186. In some embodiments, portions of the diamond shaped openings 142 may overlap with portions of the noise-attenuating openings 190 in the transition region 192 to produce a smooth transition between noise-attenuation (or other flow characterizing) operations and surge operations. As described above, the plurality of diamond-shaped openings 140 give the cage 122 a high flow capability while preserving radial strength of the cage 122 for high pressure drop situations.

Figure 4:
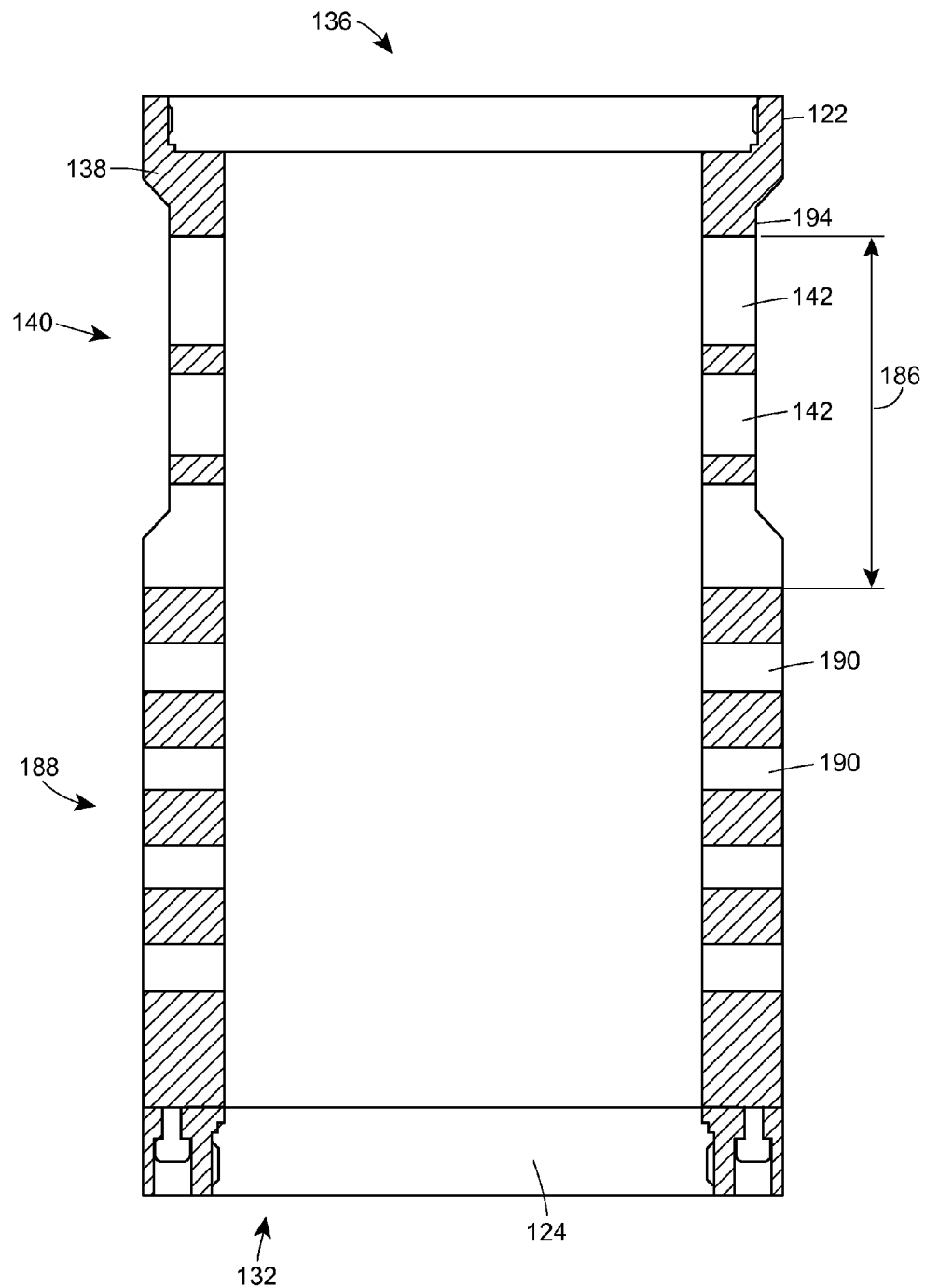
FIG. 4 is a cross-sectional view of the cage of FIG. 3.

FIG. 4 is a cross-sectional view of the cage 122 of FIG. 3. The plurality of diamond-shaped openings 140 are located closer to the second end 136 of the cage 122 than the plurality of noise-attenuating openings 188. The cage wall 138 includes a cut-out or recessed portion 194 in the vicinity of the plurality of diamond-shaped openings 140. This recessed portion 194 further increases flow through the high flow region 186.

Although certain trim assemblies and control valves have been described herein in accordance with the teachings of the present disclosure, the scope of the appended claims is not limited thereto. On the contrary, the claims cover all embodiments of the teachings of this disclosure that fairly fall within the scope of permissible equivalents.

The invention claimed is:

1. A fluid valve comprising:
   a valve body having a fluid inlet and a fluid outlet connected by a fluid passageway;
   a trim assembly disposed within the fluid passageway; and
   a fluid control member movably disposed within the fluid passageway, the fluid control member cooperating with the trim assembly to control fluid flow through the fluid passageway;
   wherein the trim assembly includes a cage having a valve seat at one end and a first plurality of diamond-shaped openings disposed in a wall of the cage, the diamond-shaped openings extending through the cage perpendicularly to a longitudinal axis of the cage, the plurality of diamond-shaped openings including a first row of diamond-shaped openings located adjacent to one another about a circumference of the cage, each diamond-shaped opening in the first row having a longitudinal axis that is parallel to the longitudinal axes of other diamond-shaped openings in the first row and parallel to the longitudinal axis of the cage, and a second row of diamond-shaped openings located adjacent to one another about a circumference of the cage, each diamond-shaped opening in the second row having a longitudinal axis that is parallel to the longitudinal axes of other diamond-shaped openings in the second row and parallel to the longitudinal axis of the cage, the longitudinal axes of the diamond-shaped openings in the first row being offset from the longitudinal axes of the diamond-shaped openings in the second row, thereby forming a web of material between the diamond-shaped openings, the web of material having a first leg, a second leg, a third leg, and a fourth leg that intersect at a center portion.

2. The fluid valve of claim 1, wherein the cage includes a second plurality of openings, at least one opening in the second plurality of openings having a shape other than a diamond-shape.

3. The fluid valve of claim 2, wherein the at least one opening in the second plurality of openings is circular in shape.

4. The fluid valve of claim 2, wherein the at least one opening in the second plurality of openings is arranged closer to the valve seat than the first plurality of openings.

5. The fluid valve of claim 4, wherein fluid flows through the second plurality of openings during normal system demand.

6. The fluid valve of claim 4, wherein fluid flows through both the first plurality of openings and the second plurality of openings during a surge condition.

7. The fluid valve of claim 2, wherein the first plurality of openings defines a high flow region and the second plurality of openings defines a flow characterizing region.

8. The fluid valve of claim 1, wherein at least one opening in the first plurality of openings includes a first portion and a second portion, the first portion having a first edge and a second edge, the first edge and the second edge forming a first intersection.

9. The fluid valve of claim 8, wherein the intersection includes an angle in the range of approximately 10 degrees to approximately 80 degrees.

10. The fluid valve of claim 8, wherein the second portion includes a third edge and a fourth edge forming a second intersection.

11. The fluid valve of claim 10, wherein the first edge and the third edge are joined by a flat segment that is substantially parallel to a longitudinal axis of the opening.

12. The fluid valve of claim 1, wherein the plurality of diamond-shaped openings further comprises a third row of diamond-shaped openings located adjacent to one another about a circumference of the cage, each diamond-shaped opening in the third row having a longitudinal axis that is parallel to the longitudinal axes of other diamond-shaped openings in the third row, parallel to the longitudinal axes of the diamond-shaped openings in the first row, and parallel to the longitudinal axis of the cage, while being offset from the longitudinal axes of the diamond-shaped openings in the second row.

13. A cage for a control valve trim assembly, the cage comprising:
a cage body having an opening at one end and a wall extending from the opening; and
a plurality of diamond-shaped openings disposed in the wall,
wherein the diamond-shaped openings extend through the wall perpendicular to a longitudinal axis of the cage body, the plurality of diamond-shaped openings including a first row of diamond-shaped openings located adjacent to one another about a circumference of the cage body, each diamond-shaped opening in the first row having a longitudinal axis that is parallel to the longitudinal axes of other diamond-shaped openings in the first row and parallel to the longitudinal axis of the cage body, and a second row of diamond-shaped openings located adjacent to one another about a circumference of the cage body, each diamond-shaped opening in the second row having a longitudinal axis that is parallel to the longitudinal axes of other diamond-shaped openings in the second row and parallel to the longitudinal axis of the cage body, the longitudinal axes of the diamond-shaped openings in the first row being offset from the longitudinal axes of the diamond-shaped openings in the second row, thereby forming a web of material between the diamond-shaped openings, the web of material having a first leg, a second leg, a third leg, and a fourth leg that intersect at a center portion.

14. The cage of claim 13, further comprising a plurality of circular openings.

15. The cage of claim 14, wherein the plurality of diamond-shaped openings is farther from a valve seat than the plurality of circular openings.

16. The cage of claim 15, wherein the plurality of diamond-shaped openings defines a high flow region of the cage and the plurality of circular openings defines a flow characterizing region of the cage.

* * * * *

UNITED STATES PATENT AND TRADEMARK OFFICE
CERTIFICATE OF CORRECTION

PATENT NO. : 9,587,764 B2
APPLICATION NO. : 14/515679
DATED : March 7, 2017
INVENTOR(S) : David Charles Juhnke et al.

It is certified that error appears in the above-identified patent and that said Letters Patent is hereby corrected as shown below:

In the Specification

At Column 3, Line 33, "second end 34," should be -- second end 36, --.

Signed and Sealed this
First Day of June, 2021

Drew Hirshfeld
*Performing the Functions and Duties of the
Under Secretary of Commerce for Intellectual Property and
Director of the United States Patent and Trademark Office*